UNITED STATES PATENT OFFICE.

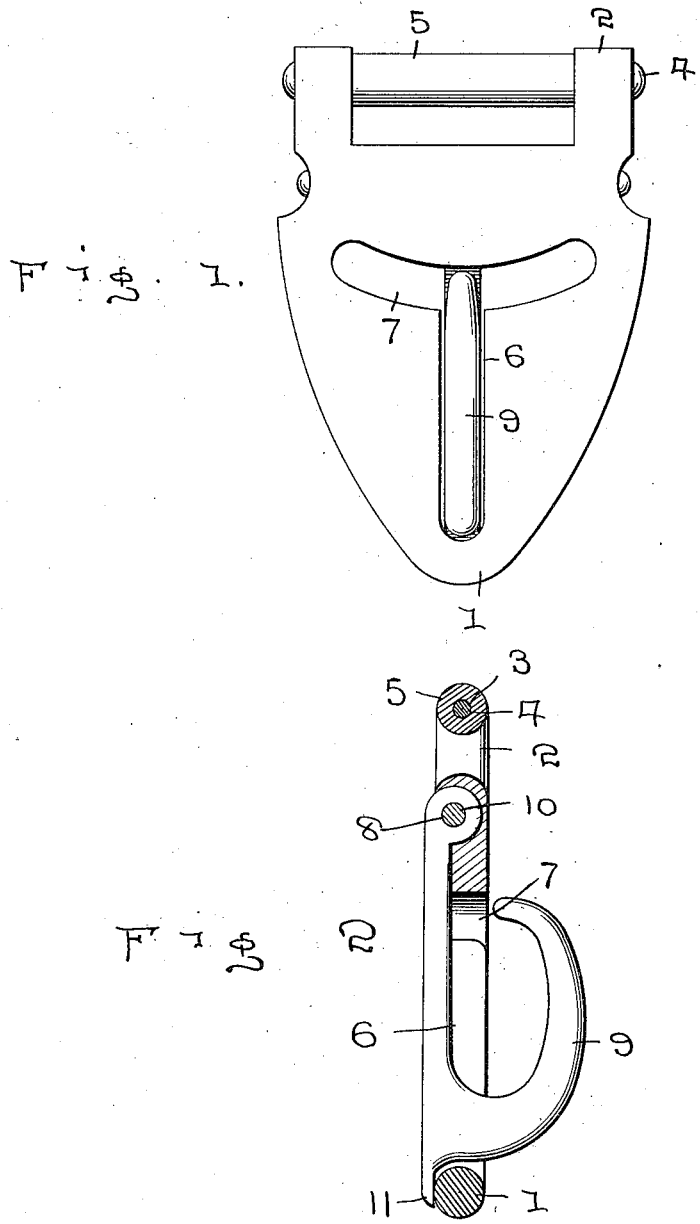

WILLIAM M. WATKINS, OF LANCASTER, KENTUCKY.

HARNESS ATTACHMENT.

999,280.  Specification of Letters Patent.  Patented Aug. 1, 1911.

Application filed September 27, 1910. Serial No. 584,156.

*To all whom it may concern:*

Be it known that I, WILLIAM M. WATKINS, a citizen of the United States, residing at Lancaster, in the county of Garrard and State of Kentucky, have invented certain new and useful Improvements in Harness Attachments; and I do hereby declare the following to be a full, clear, and exact description of the invention, such as will enable others skilled in the art to which it appertains to make and use the same.

My invention relates to new and useful improvements in harness attachments, and more particularly to trace chain supports.
The object of my invention is to provide a device for supporting trace chains which will reliably hold said chains in adjusted position, and which presents no projections upon which other parts of the harness might catch.

In the accompanying drawing, I have shown the preferred form of my invention.

In said drawing, Figure 1 is a plan view of the complete device, and Fig. 2 is a vertical sectional view therethrough.

Referring to the drawings by numerals of reference, the same numerals applying to similar parts throughout the drawing, 1 is the frame of my device which is provided with upwardly extending ears 2. The ears 2 are provided with alining apertures 3, through which is adapted to take a bolt 4. The bolt 4 is adapted to extend through and be secured in the ears 3, and to support a roller 5. The end of the back band of a harness is to be secured to the roller 5. The frame is provided with a vertically extending cutaway portion 6, and with lateral cutaway portions 7, forming a T-shaped slot.
A chain-supporting device comprising a shank portion 8 and a hook-like portion 9 is supported by a bolt 10 passing through a bead on the rear face of the body. The lower end of the shank 8 is provided with an extension 11, which is adapted to engage one side of the lower portion of the frame 1, to limit the movement of the chain-supporting device in one direction. When it is desired to support a trace chain, the supporting device is pushed inwardly until the hook 9 has cleared the cutaway portion 6. A link of the chain is then inserted through the cutaway portion 7, and placed over the end of the hook 9. The supporting device is then swung back into the position shown in Fig. 2, and the link of the chain will be moved out of the cutaway portion 7, and will be supported and held in place by the hook 9.

It will be seen by referring to Fig. 2, that when the supporting device is moved out of position shown, the upper end of the hook 9 will travel in an arc around the bolt 10. The end of the hook will therefore move below the cutaway portion 7 so that a link of the trace chain may be readily placed over the end of said hook.

What I claim is:

1. A harness attachment, comprising a plate having a slot to receive a chain link and a second slot communicating therewith, a hook pivoted to one side of the plate outwardly of the first slot and having its lower end movable through the second slot, and means for limiting the movement of the hook through the second slot.

2. A harness attachment comprising a supporting frame formed with a T-shaped slot, a hook supported on one side of the frame with its upper end located above the head of said slot and its lower end projecting through the lower portion of the slot, and a stop carried by said hook and engaging the lower end of the frame to limit the movement of the hook through the slot.

In testimony whereof I have signed my name to this specification in the presence of two subscribing witnesses.

WILLIAM M. WATKINS.

Witnesses:
GEORGE SMITH, Jr.,
H. CLAY KAUFFMAN.

---

Copies of this patent may be obtained for five cents each, by addressing the "Commissioner of Patents, Washington, D. C."